United States Patent [19]

Robeson et al.

[11] Patent Number: 5,011,894

[45] Date of Patent: Apr. 30, 1991

[54] BLENDS OF A POLY(ARYL ETHER KETONE) AND A POLYARYLATE

[75] Inventors: Lloyd M. Robeson, Whitehouse Station; James E. Harris, Piscataway, both of N.J.

[73] Assignee: Amoco Corporation, Chicago, Ill.

[21] Appl. No.: 396,849

[22] Filed: Aug. 22, 1989

Related U.S. Application Data

[60] Division of Ser. No. 295,114, Jan. 9, 1989, and a continuation of Ser. No. 87,175, Aug. 17, 1987, abandoned, and a continuation of Ser. No. 797,765, Nov. 14, 1985, abandoned, and a continuation of Ser. No. 625,915, Jun. 29, 1984, abandoned.

[51] Int. Cl.$^5$ ............................................. C08F 20/00
[52] U.S. Cl. ..................................... 525/437; 525/371
[58] Field of Search ................................. 525/437, 371

[56] References Cited

U.S. PATENT DOCUMENTS

| | | | |
|---|---|---|---|
| 3,956,240 | 5/1976 | Dahl et al. | 528/125 |
| 4,435,350 | 3/1984 | Fukushima et al. | 528/125 |
| 4,438,236 | 3/1984 | Cogswell et al. | 525/425 |
| 4,619,975 | 10/1986 | Matzner et al. | 525/437 |
| 4,668,744 | 5/1987 | Matzner et al. | 525/397 |

*Primary Examiner*—Melvyn I. Marquis
*Attorney, Agent, or Firm*—Janice M. McLain; William H. Magidson; Ralph C. Medhurst

[57] ABSTRACT

Described are blends of a crystalline poly(aryl ether ketone) and a polyarylate and/or a liquid crystalline polyarylate. These blends exhibit improved mechanical properties and environmental stress rupture resistance.

15 Claims, No Drawings

BLENDS OF A POLY(ARYL ETHER KETONE) AND A POLYARYLATE

This is a division, of application Ser. No. 295,114, filed Jan. 9, 1989, which is a continuation of Ser. No. 087,175 filed Aug. 17, 1987, abandoned, which is a continuation of Ser. No. 797,765 filed Nov. 14, 1985, abandoned, which is a continuation of Ser. No. 625,915 filed June 29, 1984, abandoned.

BACKGROUND OF THE INVENTION

This invention is directed to a blend of a crystalline poly(aryl ether ketone) and a polyarylate and/or a liquid crystalline polyarylate. These blends exhibit improved mechanical properties and environmental stress rupture resistance.

Poly(aryl ether ketones) are high performance materials which are useful for various demanding applications. They offer a combination of excellent thermal stability, hydrolytic stability, excellent chemical and environmental stress rupture resistance. This combined with very high crystalline melting points yields a property balance not available with other classes of polymers.

In the early 1980's, a poly(aryl ether ketone) of the following formula was made commercially available, e.g. U.S. Pat. No. 4,320,224:

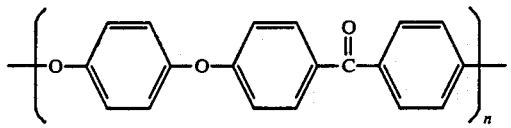

The poly(aryl ether ketone) of the following formula is known from the literature, e.g. U.S. Pat. No. 3,956,240:

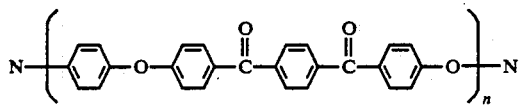

Another poly(aryl ether ketone) which was available commercially is of the following formula. e.g. U.S. Pat. No. 3,953,400:

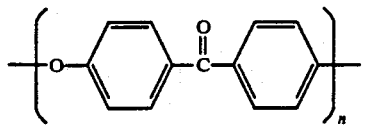

The poly(aryl ether ketones) are crystalline polymers which exhibit high melting points. Due to their high melting points, high processing temperatures are required (>300° C.) in order to fabricate the polymer. Few polymeric materials currently available are stable enough to be blended with the poly(aryl ether ketones) at such high temperatures.

Polyarylates are aromatic polyesters, many of which are derived from a dihydric phenol, particularly 2,2-bis(4-hydroxyphenyl) propane (also identified as Bisphenol-A) and an aromatic dicarboxylic acid(s), particularly mixtures of terephthalic and isophthalic acids. A preferred polyarylate is of the following formula:

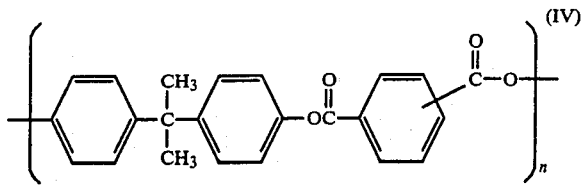

Polyarylates are high temperature, high performance thermoplastic polymers with a good combination of thermal and mechanical properties including high impact strength. The polyarylates have good melt stability at high temperatures.

In the present invention it has been found that a blend of a poly(aryl ether ketone) and a polyarylate has both a notched izod impact strength and tensile impact strength which is significantly higher than that of either of the unblended constituents. Further, the addition of poly(aryl ether ketone) to polyarylate results in a significant improvement in the environmental stress rupture resistance of the polyarylate. Also, the addition of a liquid crystalline polyarylate to a poly(aryl ether ketone) leads to improved strength.

U.S. Pat. No. 4,438,236 issued Mar. 20, 1984 describes a composition containing a melt-processable polymer and an anisotropic melt-forming polymer. Specifically, Example 6 describes blending a polyether-etherketone with a liquid crystal polyester which was copoly (chloro-1,4-phenylene ethylene dioxy-4,4'dibenzoate) terephthalate. This example states that this blend has a significant reduction in melt viscosity as compared to the polyetheretherketone polymer itself.

However, it has been found that the addition of liquid crystalline polyarylates to poly(aryl ether ketone)s leads to a decrease in melt flow (increase in viscosity) at both low and high shear rates. The blends of this invention exhibit a higher viscosity than the constituent polymers. This is contrary to the disclosure of U.S. Pat. No. 4,438,236, which states that the addition of small amounts of liquid crystalline polymers to many diverse polymer systems leads to increased melt flow (decreased viscosity). In the instant blend, some unexpected interaction between the liquid crystalline polyarylate and the poly(aryl ether ketone) must be occurring.

European Patent Application No. 59077 published Sept. 1, 1982 describes a method for the orientation of films made from a thermoplastic polyether ether ketone. This publication states that the polymer may also contain, for the purpose of improving the fluidity in extrusion processing, up to 50 wt. % of heat resistant polymers such as polyarylene polyether polysulfone, polyarylate, polyester, nylon or polycarbonate, or a polyolefin such as polyethylene or polypropylene. However, many of these blends would not be stable at the temperatures needed to mold the blend.

THE INVENTION

This invention is directed to a blend comprising a crystalline poly(aryl ether ketone) and a polyarylate and/or a liquid crystalline polyarylate.

The poly(aryl ether ketone) is used in amounts of from about 5 to about 95, preferably from about 10 to about 80 weight percent, and the polyarylate and/or liquid crystalline polyarylate is used in amounts of from about 5 to about 95, preferably from about 20 to about 90 weight percent.

The Poly(aryl ether ketone)

The crystalline poly(aryl ether ketone)s which are suitable for use herein can be generically characterized as containing a repeating unit of one or more of the following formulae:

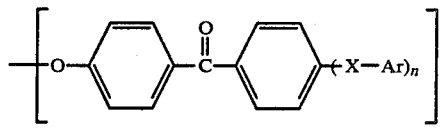  (I)

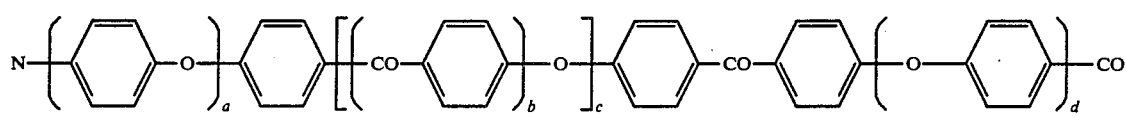  (II)

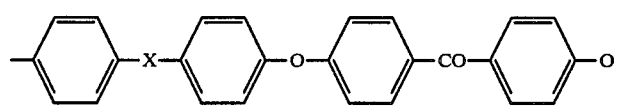  (III)

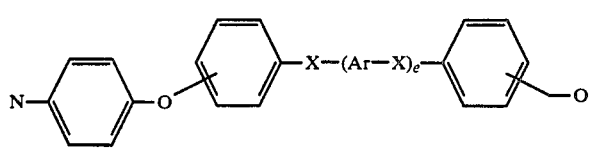  (IV)

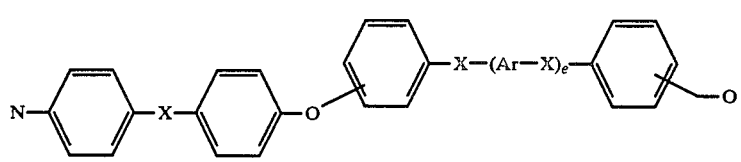  (V)

wherein Ar is independently a divalent aromatic radical selected from phenylene, biphenylene or naphthylene, X is independently

or a direct bond and n is an integer of from 0 to 3, b, c, d and e are 0 or 1 and a is an integer of 1 to 4 and preferably d is 0 when b is 1.

Preferred poly(aryl ketone)s include those having a repeating unit of the formula:

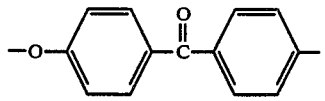

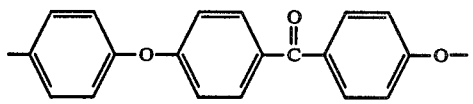

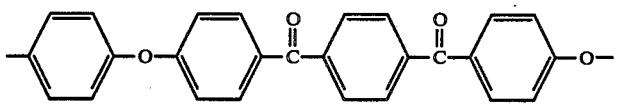

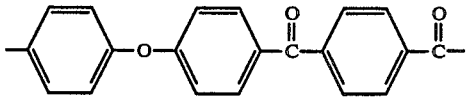

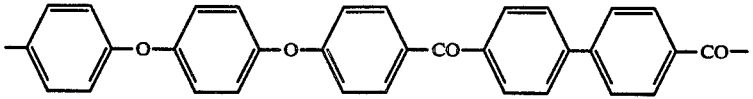

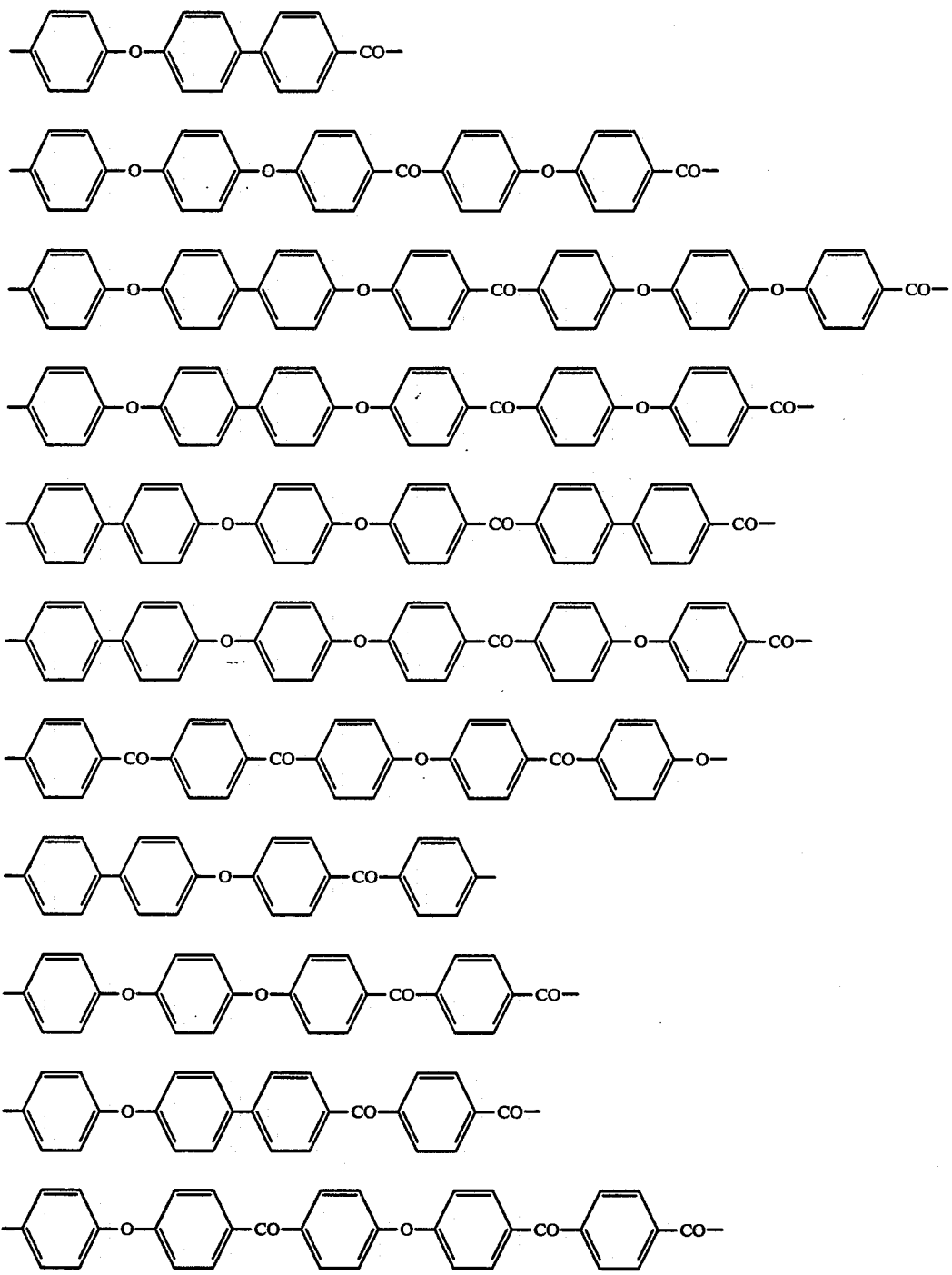

These poly(aryl ketone)s are prepared by methods well known in the art. One such method comprises heating a substantially equimolar mixture of at least one bisphenol and at least one dihalobenzoid compound or at least one halophenol compound as described in Canadian Patent No. 847,963. Preferred bisphenols in such a process include:
hydroquinone,
4,4'-dihydroxybenzophenone,
4,4'-dihydroxybiphenyl, and
4,4'-dihydroxydiphenyl ether.

Preferred dihalo and dihalobenzoid compounds include:
4-(4-chlorobenzoyl)phenol,
4,4'-difluorobenzophenone,
4,4'-dichlorobenzophenone,
4-chloro-4'-fluorobenzophenone,

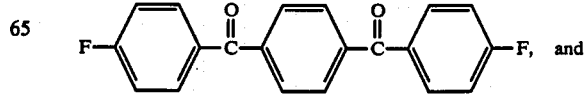
and

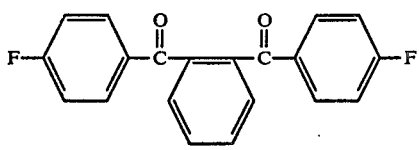

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ketone)s such as those containing repeating units of the formula:

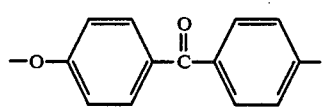

may be produced by Friedel-Craft reactions utilizing hydrogen fluoride-boron trifluoride catalysts as described, for example, in U.S. Pat. No. 3,953,400.

Additionally, poly(aryl ketones) of the following formula:

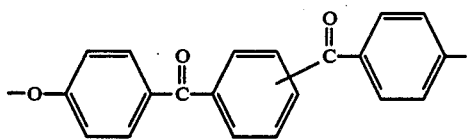

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication No. T 103,703 and U.S. Pat. No. 4,396,755. In this process, reactants such as (a) an aromatic monocarboxylic acid, (b) a mixture of at least one aromatic dicarboxylic acid, and (c) combinations of (a) and (b) are reacted in the presence of a fluoroalkane sulphonic acid, particularly trifluoromethane sulphonic acid.

Additionally, poly(aryl ketone)s of the following formulas:

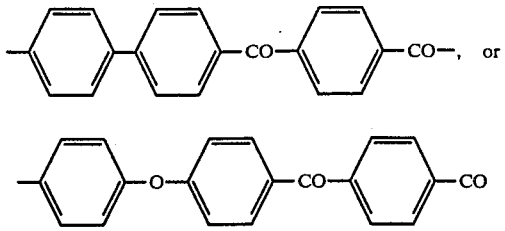

may also be prepared according to the process as described in, for example, U.S. Pat. No. 4,398,020. In such a process, (a) a mixture of substantially equimolar amounts of
(i) at least one aromatic diacyl halide of the formula $$YOC—Ar—COY$$

where —Ar— is a divalent aromatic radical, Y is halogen and COY is an aromatically bound acyl halide group, which diacyl halide is polymerizable with at least one aromatic compound of (a)(ii), and
(ii) at least one aromatic compound of the formula $$H—Ar'—H$$

where —Ar'— is a divalent aromatic radical and H is an aromatically bound hydrogen atom, which compound is polymerizable with at least one diacyl halide of (a)(i), and
(b) at least one aromatic monoacyl halide of formula $$H—Ar''—COY$$

where —Ar''— is a divalent aromatic radical and H is an aromatically bound hydrogen atom, Y is halogen, and COY is an aromatically bound acyl halide group, which monoacyl halide is self-polymerizable, and
(c) a combination of (a) and (b) in the presence of a fluoroalkene sulphonic acid.

The term poly(aryl ether ketone) as used herein is meant to include homopolymers, copolymers, terpolymers, graft copolymers, and the like. For example, any one or more of the repeating units (I) to (V) may be combined to form copolymers, etc.

The poly(aryl ether ketone)s have a reduced viscosity of at least about 0.4 to about 5.0 dl/g, as measured in concentrated sulphuric acid at 25° C.

Polyarylates

The polyarylates which are suitable for use in this invention are derived from a dihydric phenol and at least one aromatic dicarboxylic acid and have a reduced viscosity of from about 0.4 to greater than about 1.0, preferably from about 0.6 to about 0.8 dl/gm, as measured in chloroform (0.5 g/100 ml chloroform) or other suitable solvent at 25° C.

A particularly desirable dihydric phenol is of the following formula:

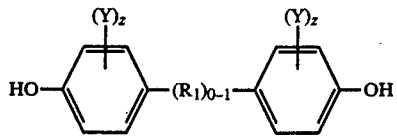

wherein Y is selected from, hydrogen, alkyl groups of 1 to 4 carbon atoms, chlorine or bromine, each z, independently, has a value of from 0 to 4, inclusive, and $R_1$ is a divalent saturated or unsaturated aliphatic hydrocarbon radical, particularly an alkylene or alkylidene radical having from 1 to 6 carbon atoms, or a cycloalkylidene or cycloalkylene radicals having up to and including 9 carbon atoms, O, $SO_2$, or S. The dihydric phenols may be used individually or in combination.

The aromatic dicarboxylic acids that may be used in this invention include terephthalic acid, isophthalic acid, any of the naphthalene dicarboxylic acids and mixtures thereof, as well as alkyl substituted homologs of these carboxylic acids, wherein the alkyl group contains from 1 to about 4 carbon atoms, and acids containing other inert substituents, such as halides, alkyl or aryl ethers, and the like. Acetoxybenzoic acid can also be used. Preferably, mixtures of isophthalic and terephthalic acids are used. The isophthalic acid to terephthalic acid ratio in the mixture is about 0:100 to about 100:0, while the most preferred acid ratio is about 75:25 to about 50:50. Also, from about 0.5 to about 20 percent of aliphatic diacids containing from 2 to about 10 carbon atoms, such as adipic acid, sebacic acid, and the like may be additionally used in the polymerization reaction.

The polyarylates of the present invention can be prepared by any of the well known prior art polyester forming reactions, such as the reaction of the acid chlorides of the aromatic dicarboxylic acids with the dihydric phenols; the reaction of the diaryl esters of the aromatic dicarboxylic acids with the dihydric phenols; or the reaction of the aromatic diacids with diester derivatives of the dihydric phenol. These processes are described in, for example, U.S. Pat. Nos. 3,317,464; 3,948,856; 3,780,148; 3,824,213; and 3,133,898.

The polyarylates of this invention include poly(arylate carbonates) which are produced by reacting a dihydric phenol with an aromatic diacid and a diaryl carbonate, such as diphenyl carbonate or carbonyl chloride by methods well known in the art.

Liquid Crystalline Polyarylate

The liquid crystalline polyarylates which may be used herein are well known in the art. These liquid crystalline polyarylates are described in, for example, U.S. Pat. Nos. 3,804,805; 3,637,595; 3,845,099; 3,318,842; 4,076,852; 4,130,545; 4,161,470; 4,230,817 and 4,265,802. Preferably, the liquid crystalline polyarylates are derived from one or more of the following: p-hydroxy benzoic acid, m-hydroxy benzoic acid, terephthalic acid, isophthalic acid, hydroquinone, resorcinol, 4,4'-biphenol, 2,6-naphthalene diol, 2,6-naphthalene dicarboxylic acid, 6-hydroxy-2-naphthoic acid and 2,6-dihydroxy anthraquinone more particularly, U.S. Pat. No. 3,637,595 discloses a polyester of recurring moieties of Formulae I, II and III:

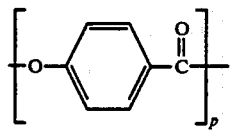
(I)

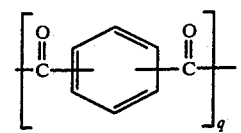
(II)

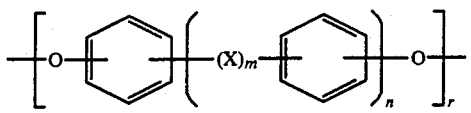
(III)

Wherein X is —O— or —$SO_2$—; m is 0 or 1; n is 0 or 1; q:r=10:15 to 15:10; p:q=1:100 to 100:1; p+q+r=3 to 600 and preferably 30 to 200. The carbonyl groups of the moiety of Formula I or II are linked to the oxy groups of a moiety of Formula I or III; the oxy groups of the moiety of Formula I or III are linked to the carbonyl groups of the moiety of Formula I or II. Two commercially available liquid crystalline copolyesters (obtained from the Carborundum Corporation) are Ekonol, a homopolymer of p-hydroxy benzoic acid, and Ekkcel, a copolymer of p-hydroxy benzoic acid, terephthalic and isophthalic acids, and 4,4'-biphenol. Other liquid crystalline polyarylates of interest include a copolyester of p-hydroxybenzoic acid and 6-hydroxy-2-naphthoic acid in a 75/25 molar ratio and a copolyester obtained by polymerizing p-acetoxybenzoic acid in a polyethylene terephtalate matrix.

It should, of course, be obvious to those skilled in the art that other additives may be included in the blends of this invention. These additives include plasticizers; pigments; flame retardants; reinforcing agents, such as glass fibers; thermal stabilizers; ultraviolet light stabilizers; impact modifiers, and the like.

EXAMPLES

The following examples serve to give specific illustrations of the practice of this invention but they are not intended in any way to limit the scope of this invention.

The following designations are used in the examples and they have the following meaning:

Polyarylate: A polymer having a repeat unit of the formula:

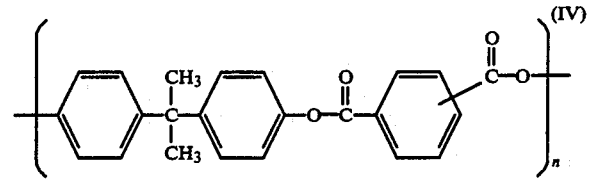
(IV)

having a reduced viscosity of 0.66 as measured in p-chlorophenol, 0.2 g/100 ml at 49° C. (ARDEL ™ D-100 obtained from Union Carbide Corp.)

Polyketone I: A polymer having a repeat unit of the formula:

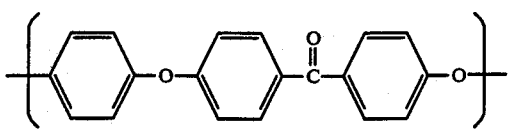

having a reduced viscosity of 1.2 as measured in 96% sulfuric acid (1 wt. % solution) at 25° C. (PEEK obtained from Imperial Chemicals Industries, Ltd.)

EXAMPLE 1

80 weight percent of the Polyarylate was blended with 20 weight percent of Polyketone I in a single screw 1-inch diameter extruder with L/D=20/1 at 360° C. The extrudate was chopped into pellets. The pelletized product was injection molded in a 1¼ oz screw injection molding machine at temperatures of 350°–390° C. into ASTM test specimens. The test specimens were measured for the following properties: tensile modulus, tensile strength, and percent elongation according to ASTM D-638, tensile impact strength according to ASTM D-1822, notched izod impact strength according to ASTM D-256, and heat distortion temperature according to ASTM D-648.

The results are shown in Table I together with the results of the unblended constituents.

EXAMPLE 2

The procedure of Example 1 was exactly repeated except that 75 weight percent of Polyarylate was blended with 25 weight percent of Polyketone I.

The results are shown in Table I.

EXAMPLE 3

The procedure of Example 1 was exactly repeated except that 60 weight percent of Polyarylate was blended with 40 weight percent of Polyketone I.

The results are shown in Table I.

EXAMPLE 4

The procedure of Example 1 was exactly repeated except that 50 weight percent of Polyarylate was blended with 50 weight percent of Polyketone I.

The results are shown in Table I.

EXAMPLE 5

The procedure of Example 1 was exactly repeated except that 40 weight percent of Polyarylate was blended with 60 weight percent of Polyketone I.

The results are shown in Table I.

TABLE I

| Example | Description of the Composition Polymer (wt. %) | Tensile Modulus (psi) | Tensile Strength (psi) | Elongation (%) | Tensile Impact Strength (ft.-lb./in$^2$) | Notched Izod Impact Strength (ft.-lbs./in. of notch) | Heat Distortion Temp. (°C.) |
| --- | --- | --- | --- | --- | --- | --- | --- |
| Control | Polyketone I (100) | 531,000 | 12,900 | 98 | 123 | 1.7 | 143 |
| Control | Polyarylate (100) | 300,000 | 10,000 | 40 | 135 | 4.2 | 165 |
| 1 | Polyarylate (80) Polyketone I (20) | 318,000 | 9,850 | 67 | 120 | 6.2 | — |
| 2 | Polyarylate (75) Polyketone I (25) | 348,000 | 10,600 | 90 | 177 | 8.0 | 145 |
| 3 | Polyarylate (60) Polyketone I (40) | 342,000 | 10,600 | 87 | 193 | 9.1 | — |
| 4 | Polyarylate (50) Polyketone I (50) | 377,000 | 11,900 | 108 | 228 | 9.7 | 147 |
| 5 | Polyarylate (40) Polyketone I (60) | 366,000 | 10,400 | 78 | 129 | 3.3 | — |

EXAMPLE 6

60 weight percent of Polyketone I was blended with 40 weight percent of a poly(arylate-carbonate) [(Lexan 3250) based on bisphenol A having an arylate/carbonate molar ratio of 87/13 and a tere/iso ratio of 73/27 for the arylate part, hereinafter Poly(arylate-carbonate) I] was prepared in a single screw one inch diameter extruder with L/D=36/1 at 350°–360° C. The blend was injection molded and tested as described in Example 1.

The properties are listed in Table II.

EXAMPLE 7

60 weight percent of Polyketone I was blended with 40 weight percent of a poly(arylate-carbonate) [(Lexan 4450) (40 wt. %) based on bisphenol A having an arylate/carbonate molar ratio of ½ and a tere/iso ratio of 87/13 for the arylate part, hereinafter Poly(arylate-carbonate) II] as described in Example 6. The blend was injection molded and tested as described in Example 1.

The results are listed in Table II.

TABLE II

Property Data for Poly(arylate-carbonate)/Poly(arylether ketone) Blends

| Sample Description | PAC-I[1] | PAC-II | PAC-I 60% Polyketone I | PAC-II 60% Polyketone I |
| --- | --- | --- | --- | --- |
| Tensile Modulus (psi) | 312,000 | 326,000 | 344,000 | 344,000 |
| Tensile Strength (psi) | 9,210 | 9,540 | 10,700 | 9,490 |
| % Elongation | 43 | 83 | 97 | 78 |
| Notched Izod Impact Strength (ft-lbs/in. of notch) | 3.6 | 9.0 | 9.4 | 13.8 |
| Tensile Impact Strength ft-lbs/in$^2$ | 48 | 149 | 173 | 165 |

[1]PAC = poly(acrylate carbonate)

EXAMPLE 8

90 weight percent of Polyketone I was blended with 10 weight percent of a liquid crystalline polyarylate (Ekkcel I-2000 obtained from Carborundum hereinafter LC-I) based on biphenol, terephthalic acid, and p-hydroxybenzoic acid by the procedure of Example 6. The blend was injection molded and tested by the procedures described in Example 1. Additionally melt flow was measured according to ASTM D-1238 under the conditions as shown in Table III.

The results are shown in Table III.

EXAMPLE 9

80 weight percent of Polyketone I was blended with 20 weight percent of the liquid crystalline polyarylate of Example 8 by the procedure of Example 6. The blend was injection molded and tested by the procedures described Example 1. Melt flow was measured according to ASTM D-1238 under the conditions as shown in Table III.

The results are shown in Table III.

TABLE III

Liquid Crystalline Polyarylate/Poly(arylether ketone) Blends

| Sample Description | LC-I | 90% Polyketone I 10% LC-I | 80% Polyketone I 20% LC-I | Polyketone I |
|---|---|---|---|---|
| Tensile Modulus (psi) | 583,000 | 549,000 | 744,000 | 531,000 |
| Tensile Strength (psi) | 10,000 | 12,800 | 13,700 | 12,900 |
| % Elongation | 2.2 | 18.3 | 2.1 | 98 |
| Tensile Impact Strength ft-lbs/in$^2$ | — | 47 | 33 | 123 |
| Notched Izod Impact Strength (ft-lbs/in. of notch) | 0.9 | 1.7 | 1.2 | 1.7 |
| Melt flow, 44 psi 400° C. | 142 | 2.5 | 0.6 | 2.8 |
| Melt flow, 440 psi 400° C. | Too high to determine | 80 | 47 | 102 |

EXAMPLE 10

90 weight percent of Polyketone I was blended with 10 weight percent of a liquid crystalline polyarylate based on 75/25 (molar ratio) p-hydroxybenzoic acid/6-hydroxy-2-naphthanoic acid and having a melt flow of 148 dg/min at 300° C. (44 psi) as per ASTM D-1238 in a brabender at 370° C. The blend was compression molded in a 4×4×0.020 inch cavity mold at 370° C. The sample was tested for mechanical properties and found to be tough and strong (tensile strength=13,100 psi). The crystallization kinetics of this blend and unblended polyketone I were determined using a Perkin-Elmer DSC-2 (differential scanning calorimeter). The data are listed in Table IV.

TABLE IV

Calorimetric and Data[1] on Polyketone/Liquid Crystalline Polyarylate Blend

| Sample | Polyketone | 90% Polyketone I 10% LC-II | LC-II |
|---|---|---|---|
| $T_m$ (°C.) | 335 | 336 | |
| $\Delta H_f$ (cal/g) | 8.8 | 7.4 | |
| $T_c$ (°C.) | 293 | 282 | |
| $\Delta H_c$ (cal/g) | 12.0 | 10.9 | |
| $t_c$ at 310° C. (seconds) | 365 | 1090 | |
| $t_c$ at 300° C. (seconds) | 103 | 305 | |
| $t_c$ at 290° C. (seconds) | 61 | 133 | |
| MF$_{10}$ (400° C.), 44 psi | 2.8 | 2.6 | 617* |
| MF$_{10}$ (400° C.), 440 psi | 102 | 59 | Too high to measure |

*Measured at 350° C., flow too high at 400° C.

[1]Samples were heated at 10° C./min up to 380° C. to determine $T_m$ and $\Delta H_f$. They were then cooled at 10° C./min to determine $T_c$ and $\Delta H_c$. The $t_c$ (time to crystallize) values were determined after heating the sample to 380° C. followed by cooling at ~160° C./min to the designated temperature. The $t_c$ value denotes the time to reach maximum crystallization rate.

EXAMPLE 11

A poly(aryl ether ketone) (25 wt. %) of the structure (hereinafter Polyketone II):

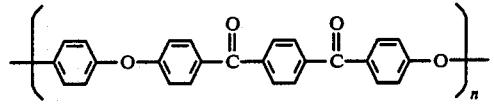

with a reduced viscosity of 1.1 as measured at 1 wt. % in 96 wt. % sulfuric acid at room temperature was blended with 75 wt. % of the Polyarylate in a Brabender blender at 375° C. The sample was compression molded at 375° C. in a 4×4×0.020 inch cavity mold. ⅛ inch wide strips of material were shear cut from the compression molded sample. A cotton swab was fastened to the center of the sample. The sample was placed under a tensile stress. The cotton swab was saturated with an organic chemical environment and aluminum foil was placed around the cotton to prevent evaporation of the environment. The time to rupture was determined for several environments for the blend and for unblended Polyarylate. The data are listed in Table V. Data on the Polyarylate control and additional Polyarylate/Polyketone blends are also listed in Table V.

TABLE V

Enviromental Stress Rupture Resistance

| | | Time to Rupture | | | | |
|---|---|---|---|---|---|---|
| Environment | Stress | 100% Polyarylate | 80% Polyarylate 20% Polyketone I | 60% Polyarylate 40% Polyketone I | 40% Polyarylate 60% Polyketone I | 75% Polyarylate 25% Polyketone II |
| Toluene | 500 psi | 2 sec R | 10 sec R | 0.92 hr R | 1 hr NCNB | 62 sec R |
| Xylene | 500 psi | 2 sec R | 12 sec R | 1 hr C&B | 1 hr NCNB | 76 sec R |
| Ethyl Acetate | 500 psi | 1 sec R | 4 sec R | 1 hr C&B | 1 hr NCNB | 12 sec R |
| Acetone | 500 psi | 1 sec R | 7 sec R | 1 hr NCNB | 1 hr NCNB | 34 sec R |

R = ruptured
C&B = crazed and brittle
NCNB = not crazed, not brittle

DISCUSSION OF THE TEST RESULTS

The mechanical property data for polyarylate-poly(aryl ether ketone) blends demonstrate utility over the entire composition range. However, the range of 0–50 wt. % poly(aryl ether ketone) yields synergistic mechanical behavior in that the impact strength data for the blends (both notched izod impact strength and tensile impact strength) are significantly higher than the unblended constituents of the blend.

The blends containing liquid crystalline polyarylate exhibit excellent strength. In the case of the p-hydroxybenzoic acid/6-hydroxy-2-naphthoic acid 75/25 copolymer, the decreased rate of crystallization (as shown by the $T_c$ and $t_c$ values) indicates a level of interaction of the liquid crystalline polyarylate and the poly(aryl ether ketone).

Surprisingly, the melt viscosity of polyaryl ketone increases with addition of liquid crystalline polyarylate. This is unexpected from the comparison of constituent melt viscosities and totally disagrees with the results described in U.S. Pat. No. 4,438,236.

The addition of poly(aryl ether ketone) to polyarylate yields significant improvements in the environmental stress rupture resistance.

These property advantages indicate the blends of poly(aryl ether ketones) and polyarylate exhibit unexpected synergistic behaviour in impact strength for polyarylates and tensile strength for liquid crystalline polyarylates. This combination of properties lead to a unique class of polymeric materials.

What is claimed is:

1. A blend comprising a crystalline poly(aryl ether ketone) and a liquid crystalline polyarylate selected from the group consisting of:
   (a) a homopolymer of p-hydroxybenzoic acid,
   (b) a copolymer of p-hydroxybenzoic acid, terephthalic and isophthalic acids and 4,4'-biphenol,
   (c) a copolymer of p-hydroxybenzoic acid and 6-hydroxy-2-naphthoic acid in a 75/25 molar ratio,
   (d) a copolyester obtained by polymerizing p-acetoxybenzoic acid in a polyethylene terephthalate matrix and;
   (e) a copolymer of p-hydroxybenzoic acid, terephthalic acid and 4,4'-biphenol.

2. A blend as defined in claim 1 wherein the poly(aryl ether ketone) is present in amounts of from about 5 to about 95 weight percent.

3. A blend as defined in claim 1 wherein the liquid crystalline polyarylate is used in amounts of from about 5 to about 95 weight percent.

4. A blend as defined in claim 1 wherein the poly(aryl ether ketone) has a repeating unit of the following formula:

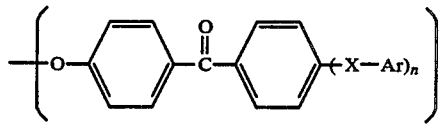

wherein Ar is independently a divalent aromatic radical selected from phenylene, biphenylene or naphthylene, X is independently

or a direct bond and n is an integer of from 0 to 3.

5. A blend as defined in claim 1 wherein the poly(aryl ether ketone) has a repeating unit of the following formula:

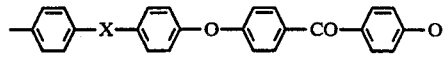

wherein X is independently

or a direct bond.

6. A blend as defined in claim 1 wherein the poly(aryl ether ketone) has a repeating unit of the formula:

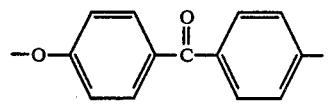

7. A blend as defined in claim 1 wherein the poly(aryl ether ketone) has a repeating unit of the formula:

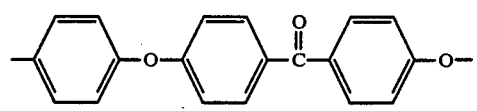

8. A blend as defined in claim 1 wherein the poly(aryl ether ketone) has a repeating unit of the formula:

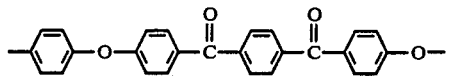

9. A blend as defined in claim 1 wherein the poly(aryl ether ketone) has a repeating unit of the formula:

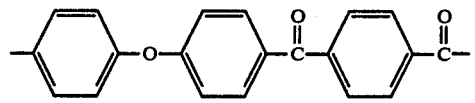

10. An injection molded article made from the blend of claim 1.

11. A blend as defined in claim 1 wherein the poly(aryl ether ketone) has a repeating unit of the following formula:

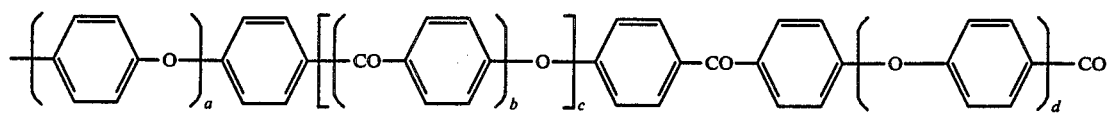

wherein a is an integer of 1 to 4 and b, c, and d are 0 or 1.

12. A blend as defined in claim 1 wherein the poly(aryl ether ketone) has a repeating unit of the following:

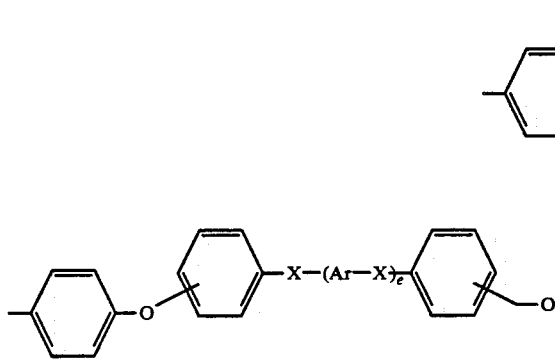

wherein Ar is a divalent aromatic radical selected from phenylene, biphenylene or naphthylene, X is independently

or a direct bond and e is 0 or 1.

13. A blend as defined in claim 1 wherein the poly(aryl ether ketone) has a repeating unit of the following formula:

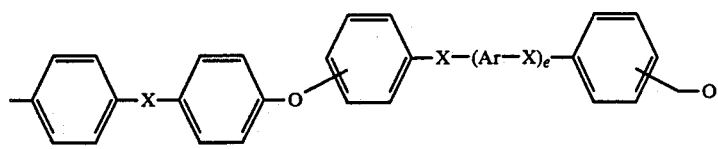

wherein Ar is a divalent aromatic radical selected from phenylene, biphenylene or napthylene, X is independently

or a direct bond and e is 0 or 1.

14. A blend as defined in claim 1 wherein the poly(aryl ether ketone) has a repeating unit of one or more of the following:

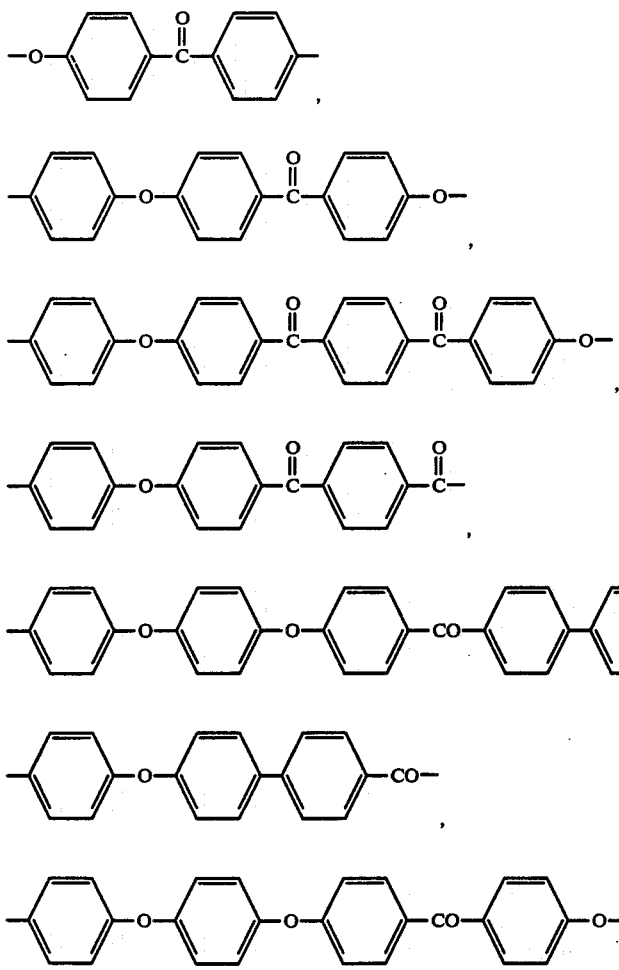

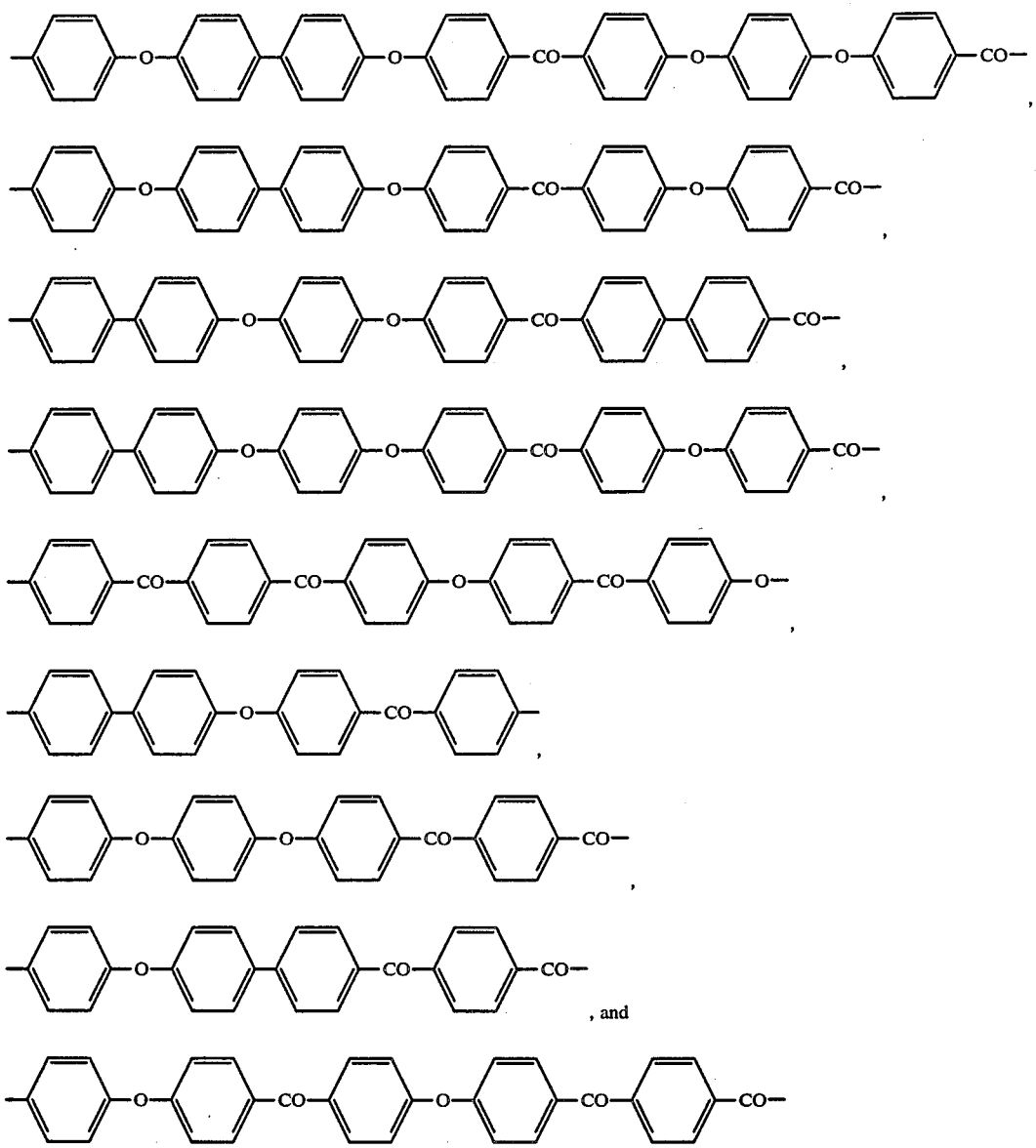
, and

15. A blend comprising a crystalline poly(aryl ether ketone) and a liquid crystalline polyarylate of recurring moieties of Formulae I, II and III:

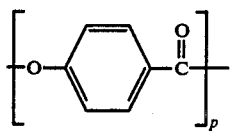 (I)

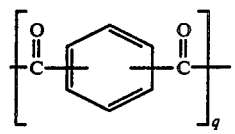 (II)

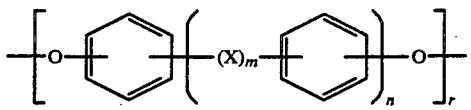 (III)

wherein X is —O— or —SO$_2$—; m is 0 or 1; n is 0 or 1; q:r=10:15 to 15:10; p:q=1:100 to 100:1; p+q+r=3 to 600; the carbonyl groups of the moiety of Formula I or II are linked to the oxy groups of a moiety of Formula I or III; the oxy groups of the moiety of Formula I or III are linked to the carbonyl groups of the moiety of Formula I or II.

* * * * *

UNITED STATES PATENT OFFICE
CERTIFICATE OF CORRECTION

Page 1 of 2

Patent No. 5,011,894     Dated April 30, 1991

Inventor(s) Lloyd M. Robeson, James E. Harris

It is certified that error appears in the above-identified patent and that said Letters Patent is hereby corrected as shown below:

Patent reads

| Col. | Line | | |
|---|---|---|---|
| 1 | 44 | "  " | should be |

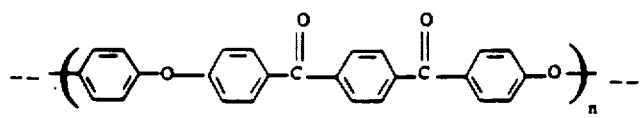

| 3 | 20 | " 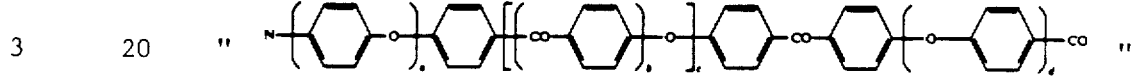 " | should be

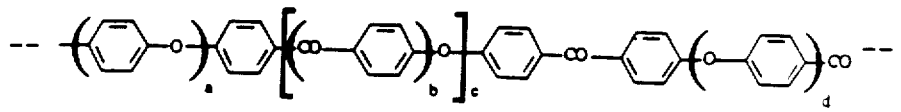

| 3 | 30 | " 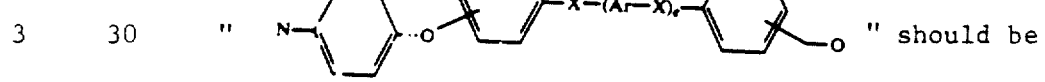 " should be |

-- 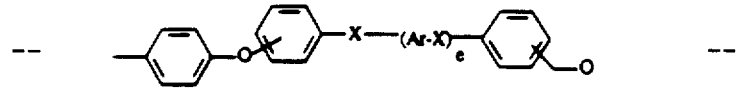 --

UNITED STATES PATENT OFFICE
CERTIFICATE OF CORRECTION

Patent No. 5,011,894                    Dated   April 30, 1919

Inventor(s)  Lloyd M. Robeson, James E. Harris

It is certified that error appears in the above-identified patent and that said Letters Patent is hereby corrected as shown below:

Patent reads

| Col. | Line |
|------|------|
| 3    | 35   |

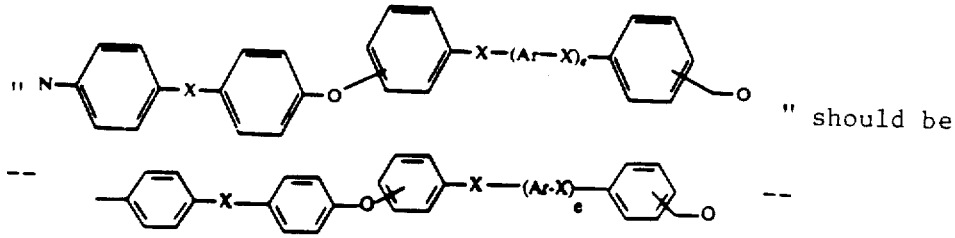

" should be

-- [corrected structure] --

Signed and Sealed this

Twenty-ninth Day of December, 1992

Attest:

DOUGLAS B. COMER

Attesting Officer     Acting Commissioner of Patents and Trademarks